US007538798B2

(12) United States Patent
Mizusawa

(10) Patent No.: US 7,538,798 B2
(45) Date of Patent: May 26, 2009

(54) IMAGE COMBINATION/CONVERSION APPARATUS

(75) Inventor: Kazufumi Mizusawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 931 days.

(21) Appl. No.: 10/484,916

(22) PCT Filed: Feb. 25, 2003

(86) PCT No.: PCT/JP03/02077

§ 371 (c)(1),
(2), (4) Date: Jan. 26, 2004

(87) PCT Pub. No.: WO03/075224

PCT Pub. Date: Sep. 12, 2003

(65) Prior Publication Data
US 2004/0201587 A1    Oct. 14, 2004

(30) Foreign Application Priority Data
Mar. 4, 2002    (JP)    ............................. 2002-057440

(51) Int. Cl.
*H04N 5/228* (2006.01)
(52) U.S. Cl. .................................................. 348/222.1
(58) Field of Classification Search .............. 348/218.1, 348/222.1, 95, 159, 394.1, 148, 94, 116; 345/536, 427; 382/201, 238, 276, 104
See application file for complete search history.

(56) References Cited
U.S. PATENT DOCUMENTS
5,703,961 A * 12/1997 Rogina et al. ................ 382/154

(Continued)

FOREIGN PATENT DOCUMENTS
JP    07-334703    12/1995

(Continued)

OTHER PUBLICATIONS
Tomohiro Tanikawa, et al. "Shiten Ichi ni Ojita Gazo oyobi Model no Doteki Kirikae ni yoru Shajitsuteki na Kaso Sekai no Kochiku", ITE Technical Report, Jun. 7, 1999.

*Primary Examiner*—Tuan V Ho
*Assistant Examiner*—Gary C Vieaux
(74) *Attorney, Agent, or Firm*—Pearne & Gordon LLP

(57) ABSTRACT

A subject of the present invention is to form simply a mapping table, which transforms a picked-up image of a real camera into an image viewed from a virtual viewpoint, by a small amount of computation.

An image transforming system of the present invention has an imaging means (10) for picking up a real image, a coordinate recording means (32) for recording a three-dimensional position on a projection model corresponding to a previously-computed pixel position of a virtual camera, a means for computing a positional relationship between the virtual camera and the imaging means (10), means (20)(30) for forming and recording a mapping table, which transforms the real image into an image viewed from the virtual camera, based on information of the positional relationship and information of the three-dimensional position recorded in the coordinate recording means (32), and a means (40) for mapping the real image by using the mapping table. The means for computing the positional relationship predicts the positional relationship from the installation position, and inputs it into the means (20) for forming the mapping table as a camera parameter when an installation position of the imaging means (10) is decided previously.

6 Claims, 9 Drawing Sheets

U.S. PATENT DOCUMENTS

| | | | |
|---|---|---|---|
| 5,796,991 A * | 8/1998 | Shimizu | 703/1 |
| 6,081,273 A * | 6/2000 | Weng et al. | 345/420 |
| 6,184,892 B1 | 2/2001 | Toriu et al. | |
| 6,522,787 B1 * | 2/2003 | Kumar et al. | 382/268 |
| 6,573,912 B1 * | 6/2003 | Suzuki et al. | 715/757 |
| 6,785,404 B1 * | 8/2004 | Shimazaki et al. | 382/104 |
| 7,058,207 B2 * | 6/2006 | Iida et al. | 382/104 |
| 7,161,616 B1 * | 1/2007 | Okamoto et al. | 348/148 |
| 2002/0122117 A1 * | 9/2002 | Nakagawa et al. | 348/218 |

FOREIGN PATENT DOCUMENTS

| | | |
|---|---|---|
| JP | 10-097642 | 4/1998 |
| JP | 10-198824 | 7/1998 |
| JP | 2000-215311 | 8/2000 |
| JP | 00/07373 | 10/2000 |
| JP | 2001-291116 A | 10/2001 |
| JP | 2001-347909 | 12/2001 |
| WO | 00/64175 | 10/2000 |
| WO | 03/075224 A1 | 9/2003 |

* cited by examiner

IMAGE COMBINATION/CONVERSION APPARATUS

TECHNICAL FIELD

The present invention relates to an image synthesizing transforming system which synthesizes a image picked up by a real camera into a transformed image picked up by a virtual camera in real time.

BACKGROUND ART

As the image synthesizing transforming system for synthesizing/transforming the images picked up by a plurality of real cameras in the related art, there is the system set forth in International Publication WO00/64175, for example. This system will be explained with reference to FIG. 10 hereunder.

The image synthesizing transforming system in the related art is configured to have an imaging means 110 and an image processing portion 120. The imaging means 110 includes a plurality of cameras 111, 112 and frame memories 113, 114 corresponding to respective cameras 111, 112. Images input from respective cameras 111, 112 are written into the corresponding frame memories 113, 114.

The image processing portion 120 includes an image synthesizing means 121, a mapping table looking-up means 122, and a video signal generating means 123. The mapping table looking-up means 122 includes a transformation address memory 131 for storing transformation addresses (mapping table) indicating correspondences between position coordinates of output pixels and position coordinates of input pixels, and a degree-of-necessity memory 132 for recording degree-of-necessities of respective input pixels at that time.

The image synthesizing means 121 generates data of the output pixels by adding data of respective pixels in the frame memories 113, 114 according to designated degree-of-necessities, based on the transformation addresses (mapping table) recorded in the mapping table looking-up means 122. The video signal generating means 123 outputs the data of the output pixels generated by the image synthesizing means 121 as an image signal. In this case, above processes are carried out based on an appropriate synchronizing signal such as an input image signal, or the like, for example.

The image synthesizing means 121 implements in real time to synthesize the images input from two different cameras 111, 112 in compliance with the mapping table looking-up means 122, synthesize smoothly the input images from a plurality of different cameras by generating the output image while changing the pixel positions, and transform the input images into the image viewed from the virtual viewpoint. However, in order to execute the image synthesis in real time, it is required that the mapping table used in the image synthesis is previously recorded in the mapping table looking-up means 122.

Next, procedures of forming the mapping table will be explained hereunder. In order to form the mapping table, coordinates of the pixels of respective camera images corresponding to respective pixels of the synthesized image viewed from the virtual viewpoint (installing position of the virtual camera) must be decided. Procedures of deciding this correspondence are classified into two phases consisting of a phase in which positions of points on a global coordinate system, which correspond to respective pixels of the synthesized image viewed from the virtual viewpoint, are calculated and a phase in which coordinates of the pixels on the real camera, which correspond to calculated positions of the points on the global coordinate system, are calculated.

In this case, the relationships recorded finally on the mapping table are only relationships between respective pixels of the synthesized image viewed from the virtual viewpoint and pixels of respective camera images (real images). The procedures of forming the mapping table are not limited to the system that is executed via the points on the above global coordinate system. However, the mapping table formed via the points on the above global coordinate system is excellent in respect of formation of the synthesized image, by which surrounding circumstances can be correlated easily with actual distances and positional relationships, since the meaning of the synthesized image on the global coordinate system as the coordinate system in the real world can be made clear.

A relationship between the pixel position $[mi]=(xi,yi)$ of the virtual camera and the camera coordinate $[Pi]=(Xi,Yi,Zi)$ of the virtual camera are defined as follows.

$xi=Xi/Zi$ (where $Zi$ is not 0)

$yi=Yi/Zi$ (where $Zi$ is not 0)

The transformation from the camera coordinate [Pi] of the virtual camera to the global coordinate [Pw] is executed by using three-dimensional rotation [Ri] and transformation [Ti] as follows.

$[Pw]=[Ri][Pi]+[Ti]$

Similarly, the transformation from the global coordinate [Pw] into the camera coordinate [Pr] of the real camera is executed by using three-dimensional rotation [Rr] and transformation [Tr] as follows.

$[Pr]=[Rr][Pw]+[Tr]$

The transformation from the camera coordinate system of the virtual camera to the global coordinate system and the transformation from the global coordinate system to the camera coordinate system of the real camera are schematically shown in FIG. 11. That is, an image M represented by the camera coordinate system C of the virtual camera and an image M' represented by the camera coordinate system C' of the real camera are correlated with each other via a global coordinate system O of the image.

Also, the transformation from the camera coordinate [Pr]=(Vxe, Vye, Vze) of the real camera to a two-dimensional coordinate $[Mr]=(xr, yr)$ of the real camera on the viewing screen is executed based on the perspective projection transformation by using a focal length fv as follows.

$$xr = (fv/Vze) \cdot Vxe$$

$$yr = (fv/Vze) \cdot Vye$$

The position obtained by transforming this coordinate into the unit of the pixel and correcting the position in light of a lens distortion of the real camera corresponds to a position of the pixel by the real camera. In order to correct the lens distortion, there are the system for utilizing a table in which relationships between a distance from a lens center and an amount of correction are recorded, the system for approximating by using a mathematical distortion model, etc.

At this time, since a three-dimensional profile of the subject existing on the global coordinate system is unknown, a scale factor λ (λ is a real number except 0) of [Pi] becomes indefinite in the transformation from the pixel position [mi] of the virtual camera to the camera coordinate [Pi] of the virtual camera. That is, in FIG. 12, all points on a straight line l, e.g., a point K and a point Q, are projected on the same pixel position X (xi, yi). Therefore, one point on the straight line l is decided by assuming an appropriate projection model as a profile of the object that is viewed from the virtual viewpoint. That is, an intersection point between the projection model and the straight line l is set as a point on the global coordinate system.

In this case, a Zw=0 plane, etc. on the global coordinate system, for example, may be considered as the projection model. If the appropriate projection model is set in this manner, correspondences between respective pixels [Pi] on the synthesized image viewed from the virtual point and the pixels [Pr] on the real camera image can be computed by the above procedures.

In order to compute these correspondences, a great deal of computation, e.g., coordinate calculation of the points on the projection model, transformation between the camera coordinate system and the global coordinate system, computation to decide onto which camera the coordinate on the projection model is projected if the number of cameras is large, etc. is needed.

Meanwhile, a request for the image having a wide visual field is enhanced as a monitor camera used for the purpose of the monitor, a car-equipped camera used for the purpose of the driving assistance, etc., are spread widely. Therefore, it is requested that an image picked up by a sole camera using a fisheye lens, or the like on behalf of a super-wide-angle lens or images picked up by a plurality of cameras are synthesized/transformed to provide the image which can be viewed as if such image is picked up by one camera. Also, there appear nowadays the applications in which only a necessary area is extracted from the image having a wide visual field, deformed and displayed, the image is transformed in the pseudo-image picked up by the virtual camera and displayed, etc.

In order to execute such synthesis/transformation of the image by applying the above related art, a large amount of computation is needed as described above. For this reason, a computing unit having a huge computation power is required to execute the computation in real time, and such synthesis/transformation is not practical. As a result, the mainstream is the system for recording correspondences between input images and output images as a mapping table by executing the computation previously and then synthesizing/transforming the image in real time while looking up the mapping table.

In order to utilize the previously-computed mapping table, since the mapping table depends on an installation position of the actual camera, the actual camera must be set exactly at the same position as the installation position of the camera that was used at the time of computation of the mapping table. However, it is possible to say that this approach is not so practical. Also, if the installed position of the camera is displaced due to any cause in the course of use after the camera could be installed exactly, the camera must be restored to the original installation position, and this approach is also not practical.

It is possible to say that, since it is not practical to adjust physically the installation position of the actual camera in this manner, preferably the mapping table should be computed after the camera is installed. In this case, if the mapping table is computed in the inside of the image synthesizing transforming equipment, a high-performance computing unit that can execute a huge mount of computation is needed. However, since the high-performance computing unit is not used ordinarily after the mapping table has been computed, it is possible to say that this approach is also not practical.

Also, if the mapping table is computed by an external high-performance computing unit, the computed mapping table must be transferred to the inside of the image synthesizing transforming equipment from the external unit. For example, if the image synthesizing/transforming system is built in the device in the vehicle, or the like, it is not practical to install the dedicated interface, which is used to transfer the mapping table but not used ordinarily, to the outside of the device.

Accordingly, it is expected that the device having the previously-set external interface is used together. In this case, the mapping table needs the data transmission of (number of pixels)×(mapping data capacity per pixel), and thus a high-speed transferring circumstance is needed. There is the CAN BUS nowadays as the interface that can execute the data transmission of the vehicle. This interface intends to transfer the control data and does not intend to transfer the large data like the mapping table. Thus, it is impossible to say that this approach is practical.

The object of the present invention is to provide an inexpensive image synthesizing transforming system which enables to calculate a mapping table without a computing unit of high performance after cameras are installed, and has a wide versatility and needs easy maintenance.

DISCLOSURE OF INVENTION

In order to attain the above object, an image transforming system of the present invention provides an image transforming system for transforming an image input from imaging means, which picks up a real image, into a virtual image viewed from a predetermined virtual viewpoint to output, which has first storing means for recording a correspondence between a pixel on the virtual image and a point on a projection model, and second storing means for recording a correspondence between the pixel on the virtual image and a pixel on the real image, wherein the pixel on the real image and the pixel on the virtual image are mutually correlated via a point on a predetermined projection model; inputting means for inputting a positional relationship between the imaging means and the virtual viewpoint; and computing means for rewriting contents recorded in the second storing means based on contents in the first storing means and the positional relationship.

According to this configuration, the mapping table can be computed not to build in the high-performance computing unit after the imaging means is installed, and image synthesis/transformation can be executed with an inexpensive configuration.

Preferably, the image transforming system further has means for predicting the positional relationship based on an installation position of the imaging means, in place of the inputting means, when the installation position of the imaging means is previously decided. Also, the image transforming system further has means for obtaining a relative position of the imaging means with respect to the point on the projection model as calibration data and predicting the positional relationship based on the calibration data, in place of the inputting means. Further, a positional relationship between the virtual camera and the imaging means is obtained by using calibration data acquired by external calibrating means, in place of the inputting means.

Accordingly, easiness of the installation of the imaging synthesizing transforming system means is improved. Also, even when fitting positions of the imaging means are displaced by any cause, the mapping table can be reformed without an external high-performance computing unit, and thus the maintenance is facilitated. In addition, if the calibrating means is built in, all the processes can be completed by the internal processing. The processes executed after the installation of the imaging means can be carried out by the image synthesizing transforming system solely.

More preferably, the first storing means includes recording means for recording aggregation data of points on the projection model in a compressed format by a predictive coding, and decompressing means for decompressing the aggregation data compressed and recorded by the recording means to restore the aggregation data to an original format. According to this configuration, a necessary memory capacity can be reduced and the data can be decompressed by a small amount of computation.

Figure 1:
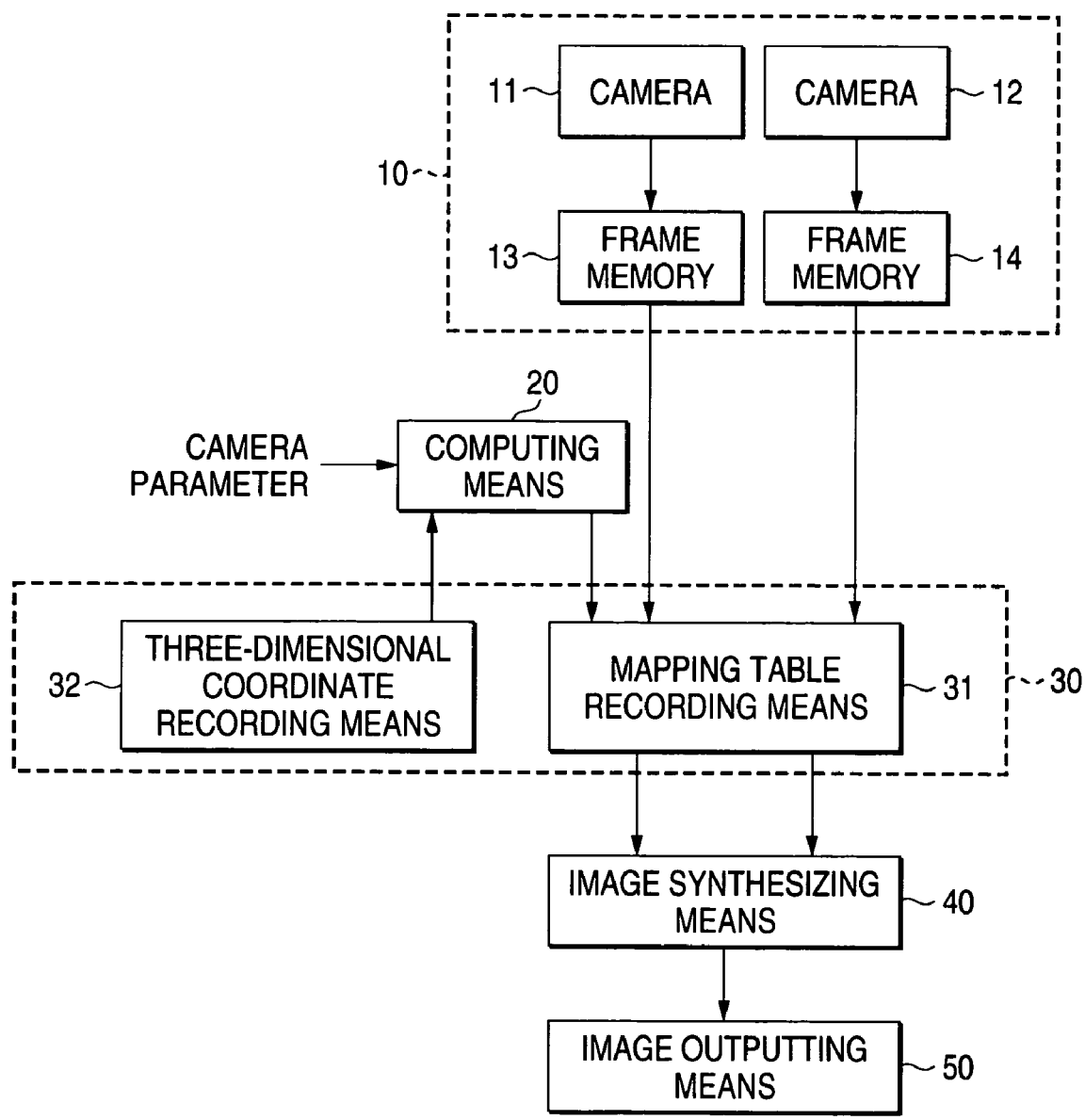
FIG. 1 is a block diagram of an image synthesizing transforming system according to a first embodiment of the present invention.

In Figures, a reference numeral 10 is an imaging means, 11, 12 are a camera, 13, 14 are a frame memory, 20 is a computing means, 30 is a mapping table looking-up means, 31 is a mapping table recording means, 32 is a three-dimensional coordinate recording means, 33 is an decompressing means, 34 is a compressing means, 40 is an image synthesizing means, 50 is an image outputting means, 60 is a calibrating means, 61 is a controller, 62 is a calibration computing means, 63 is a mark superposing means, and 64 is a monitor.

Best Mode for Carrying Out the Invention

Embodiments of the present invention will be explained with reference to the drawings hereinafter.

First Embodiment

FIG. 1 is a block diagram of an image synthesizing transforming system according to a first embodiment of the present invention. This image synthesizing transforming system is configured to have an imaging means 10, a computing means 20, a mapping table looking-up means 30, an image synthesizing means 40, and an image outputting means 50.

The imaging means 10 includes a camera 11 for picking up the real image, and a frame memory 13 for recording the image picked up by the camera 11. The imaging means 10 might include a plurality of cameras 11. The imaging means 10 of this embodiment includes a camera 12 and a frame memory 14 in addition to the camera 11 and the frame memory 13.

The computing means 20 computes pixel positions of the input image which is necessary for generation of the output image, based on a camera parameter input separately and three-dimensional positions on a projection model, which correspond to pixel positions of the virtual camera previously computed with looking up a mapping table by the mapping table looking-up means 30. Computed results are recorded in the mapping table looking-up means 30 as the mapping table.

The mapping table looking-up means 30 includes a mapping table recording means 31 for recording the mapping table, and a three-dimensional coordinate recording means 32 for recording three-dimensional positions on the projection model, which correspond to the previously-computed pixel positions of the virtual camera described later. In this embodiment, the mapping table is computed based on three-dimensional position data on the projection model recorded in the three-dimensional coordinate recording means 32 and the installation position of the real camera, and the computed mapping table is recorded in the mapping table recording means 31.

The image synthesizing means 40 reads the input image corresponding to the pixels of the output image from the imaging means 10 by looking up the mapping table looking-up means 30, and generates the pixels of the output image. Also, the image outputting means 50 generates the output image from the pixels that the image synthesizing means 40 generated to output the output image.

Next, an operation of the above image synthesizing transforming system will be explained hereunder. The mapping table used by the image synthesizing means 40 depends on the installation position of the imaging means 10 even though the position of the virtual viewpoint is fixed. Therefore, the mapping table must be formed in a stage at which the system is used first after the imaging means 10 is installed. At first, procedures of forming the mapping table will be explained hereunder.

The three-dimensional position data on the projection model corresponding to the previously-computed pixel positions of the virtual camera are recorded in the three-dimensional coordinate recording means 32. The projection model is set to eliminate an infinity caused by the perspective transformation, and is defined by a flat plane, a cylindrical plane, etc., for example.

Figure 2:
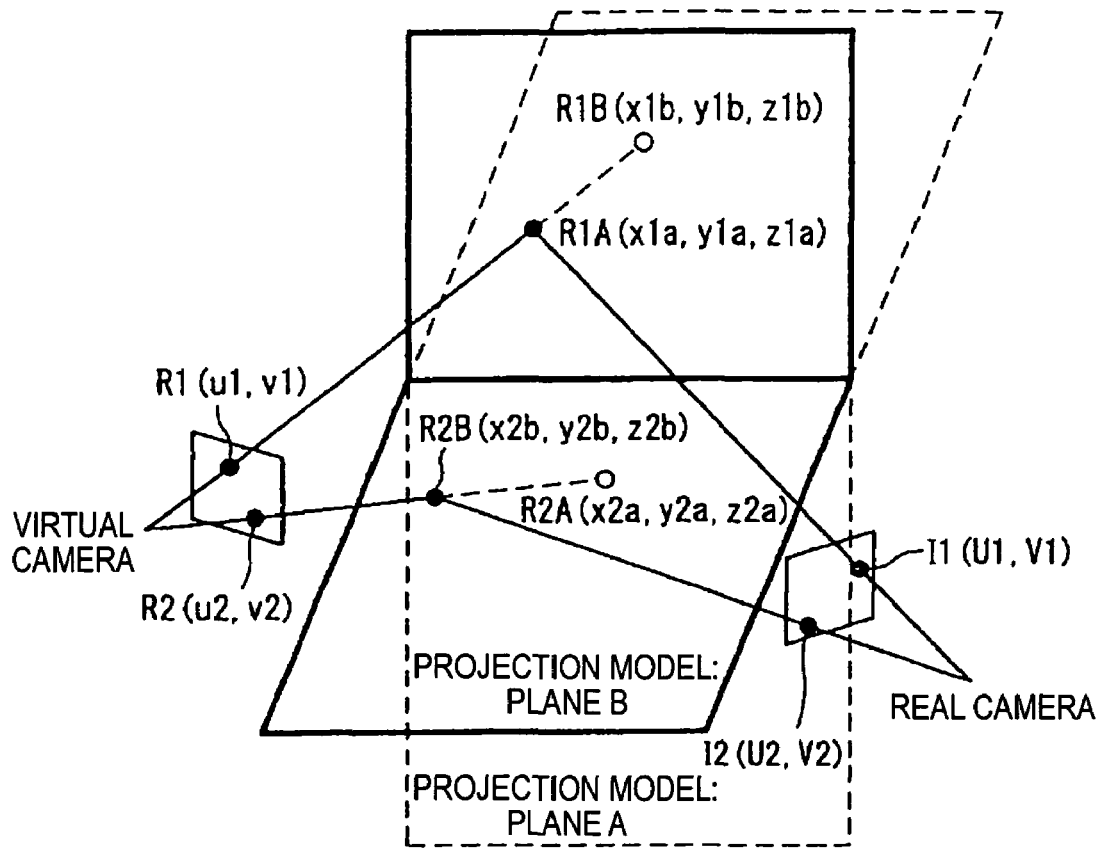
FIG. 2 is an explanatory view of a viewing transformation by projection models used in the image synthesizing transforming system according to the first embodiment of the present invention.

FIG. 2 is a view showing an example in which two planes of a plane A and a plane B are set as the projection model. In the case of FIG. 2, for example, a coordinate (x1a, y1a, z1a) of a point R1A on the plane A is recorded in the three-dimensional coordinate recording means 32 as a three-dimensional position corresponding to a position (u1, v1) of a pixel R1 of the output image, and a coordinate (x2b, y2b, z2b) of a point R2B on the plane B is recorded in the three-dimensional coordinate recording means 32 as a three-dimensional position corresponding to a position (u2, v2) of a pixel R2 of the output image.

These points on the three-dimensional coordinate system are computed as intersection points between a straight line indicating a viewing vector and projection model planes. Therefore, if the projection model is defined by the multi-dimentional polynominal such as a curved surface, etc., an amount of computation applied to compute the three-dimensional coordinate becomes huge. Also, as apparent from FIG. 2, if the projection model is defined by a plurality of planes and curved surfaces, a plurality of candidate points on the projection model corresponding to the pixel on the image by the virtual camera are present. Therefore, all these plural candidate points are computed as the intersection points between the straight line indicating the viewing vector and the projection model planes, and thus computations to compute the intersection points are needed as many as the candidate points.

More particularly, in FIG. 2, the point R1A projected onto the plane A and the point R1B projected onto the plane B are present as the candidate point corresponding to the point R1, and then the point R1A that is closer in distance to the virtual camera is selected as a corresponding point among these two candidate points. Similarly, the point R2A projected onto the plane A and the point R2B projected onto the plane B are present as the candidate point corresponding to the point R2, and then the point R2B that is closer in distance to the virtual camera is selected as the corresponding point.

Here, it depends on the definition of the model which point should be selected as the corresponding point from a plurality of candidate points. The computations such as distance computation, etc., for example, are required to contracting a plurality of candidate points into one candidate point. The computation of the candidate point is executed with the same procedures of the related art.

In FIG. 2, the case where one real camera is used is shown. However, as shown in FIG. 3, when a plurality of real cameras are used, points on respective cameras, which correspond to the pixels on the image of the virtual camera, are computed by applying the same process to respective cameras.

Figure 3:
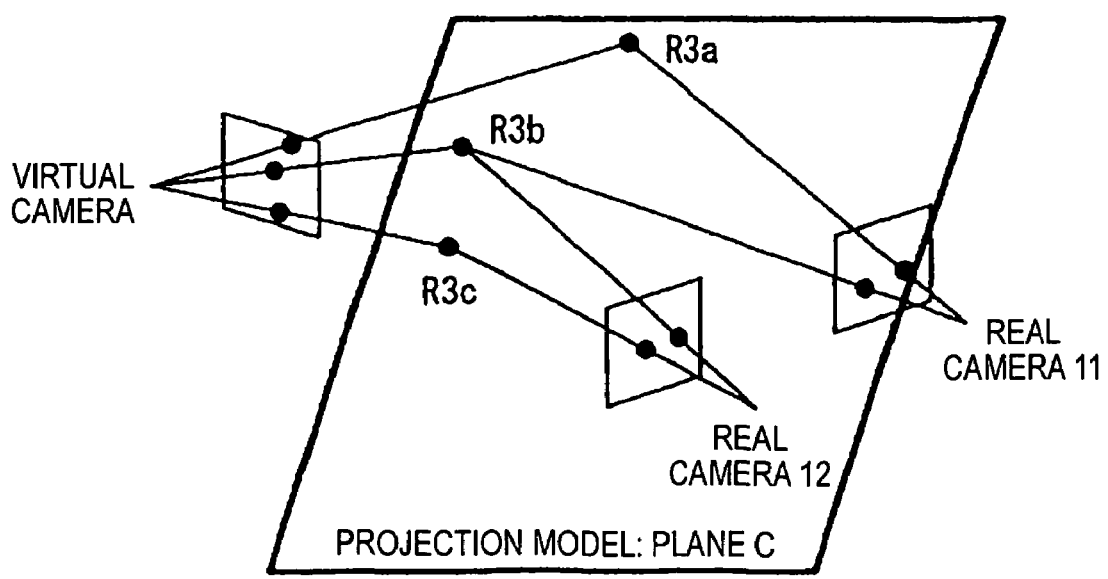
FIG. 3 is an explanatory view of a correspondence between a virtual camera and a real camera in the mapping table used in the image synthesizing transforming system according to the first embodiment of the present invention.

In FIG. 3, points on the projection model planes corresponding to three pixels on the virtual camera are shown as R3a, R3b, R3c. The coordinates of R3a, R3b, R3c are recorded to the three-dimensional coordinate recording means 32 as three-dimensional positions of the corresponding points on the projection model, which correspond to respective pixels on the virtual camera.

Here, if positional relationships between the virtual camera and the real cameras can be predicted previously with predetermined precision, it can be computed on which camera the corresponding points on the projection model have the corresponding point. For example, since normally the installation position of the monitor camera, the car-equipped camera, or the like as the position which permits to pick up the image of the monitoring object, or the like is restricted, positional relationships between the virtual camera and the real cameras can be predicted previously. Therefore, the mapping table can be formed by inputting predicted positional data of the real camera into the computing means 20 as the camera parameter and using recorded data in the three-dimensional coordinate recording means 32.

Also, since pixel positions of the real cameras with respect to the corresponding points on the projection model, which correspond to the pixels on the virtual camera, can be measured easily by the well-known calibrating means, positional relationships between the virtual camera and the real cameras can be set by receiving the measured data. In this case, as a third embodiment described later, an example in which a calibrating means is built will be explained.

In FIG. 3, the point R3a has the corresponding point only on the image of the real camera 11, and the point R3c has the corresponding point only on the image of the real camera 12. Also, the point R3a has the corresponding point on both images of the camera 11 and the camera 12.

Under this situation, it is wasteful that the computation is executed to compute the corresponding point of the point R3a with respect to the camera 12 or compute the corresponding point of the point R3c with respect to the camera 11. Therefore, if not only the three-dimensional coordinates corresponding to the pixels on the image of the virtual camera but also identifying codes of the camera on the screen of which the corresponding pixels are present are recorded in the three-dimensional coordinate recording means 32, for example, the useless computation is not applied to the real cameras having the possibility that the corresponding pixels are not present thereon at all, and thus an amount of computation required for the formation of the mapping table can be reduced.

Also, since a degree-of-necessity of respective cameras required to compute the pixels of the output image from the pixels of plural cameras can be previously computed in addition to the identifying codes of the cameras, the degree-of-necessity can be recorded at the same time. Therefore, computation of the degree-of-necessity can also be omitted. The degree-of-necessity of each camera can be computed based on the three-dimensional position on the projection model planes, for example, by normalizing a ratio of reciprocals of the distances to respective real cameras, or the like. The meaning of the degree-of-necessity will be explained in the operation explanation of the image synthesizing means 40.

In this manner, in the image synthesizing transforming system of the present embodiment, if three-dimensional positions of the corresponding points on the projection model corresponding to the pixels on the virtual camera are computed in advance and then recorded in the three-dimensional coordinate recording means 32, a huge amount of computation required to compute the three-dimensional positions recorded in the three-dimensional coordinate recording means 32 is not required of the computing means 20. Even when the installation positions of the real cameras are displaced, the computing means 20 can compute the mapping table, which corresponds to new installation positions of the real cameras, at a high speed by using the data in the three-dimensional coordinate recording means 32.

The computing means 20 computes the pixel positions on the real cameras corresponding to the pixel positions of the virtual camera, based on the three-dimensional coordinate obtained by looking up the three-dimensional coordinate recording means 32 to correspond to the pixel positions of the virtual camera and the camera parameter of the real cameras being input separately. In the case of FIG. 2, as described above, the coordinate (x1a, y1a, z1a) of the point R1A on the plane A as the three-dimensional position corresponding to the position (u1, v1) of the pixel R1 of the output image, and the coordinate (x2b, y2b, z2b) of the point R2B on the plane B as the three-dimensional position corresponding to the position (u2, v2) of the pixel R2 of the output image, for example, are recorded in the three-dimensional coordinate recording means 32.

When points of the real cameras onto which these points are projected are computed by the perspective transformation, the point R1A and the point R2B are projected onto a point I1 (U1, V1) and a point I2 (U2, V2) respectively. The computing means 20 forms the mapping table based on the result, and stores the table into the mapping table recording means 31.

In the situation that a plurality of real cameras are present, positional relationships between the virtual camera and the real cameras can be previously predicted with predetermined precision, and the three-dimensional coordinates corresponding to the pixels on the image of the virtual camera and the identifying codes of the cameras on the screen of which corresponding pixels are present are recorded in the three-dimensional coordinate recording means 32, the computing means 20 computes only the pixel positions corresponding to the cameras whose identifying codes are recorded.

Figure 9:
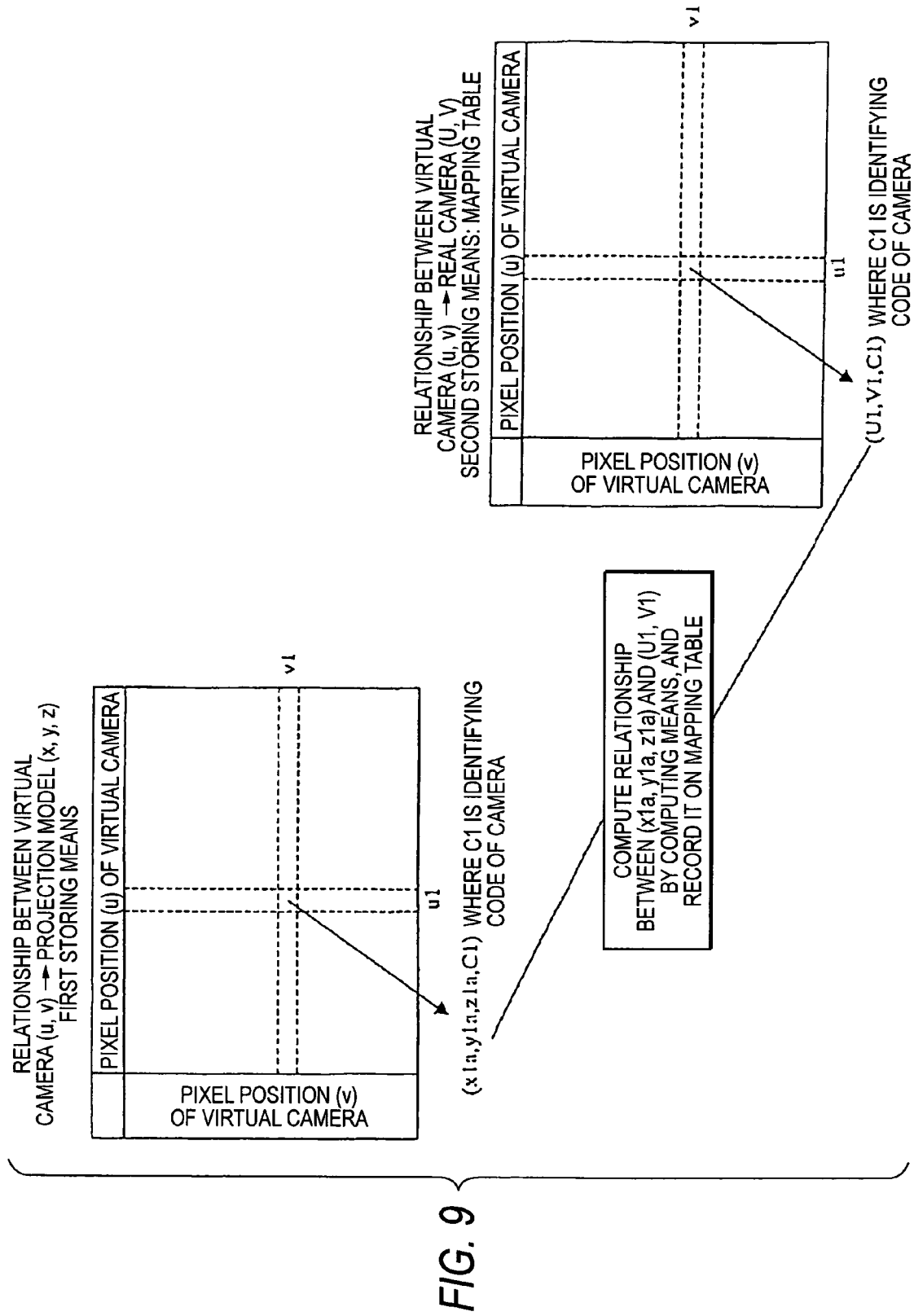
FIG. 9 is an explanatory view of a mapping table used in the image synthesizing transforming system according to the first embodiment of the present invention.
Figure 10:
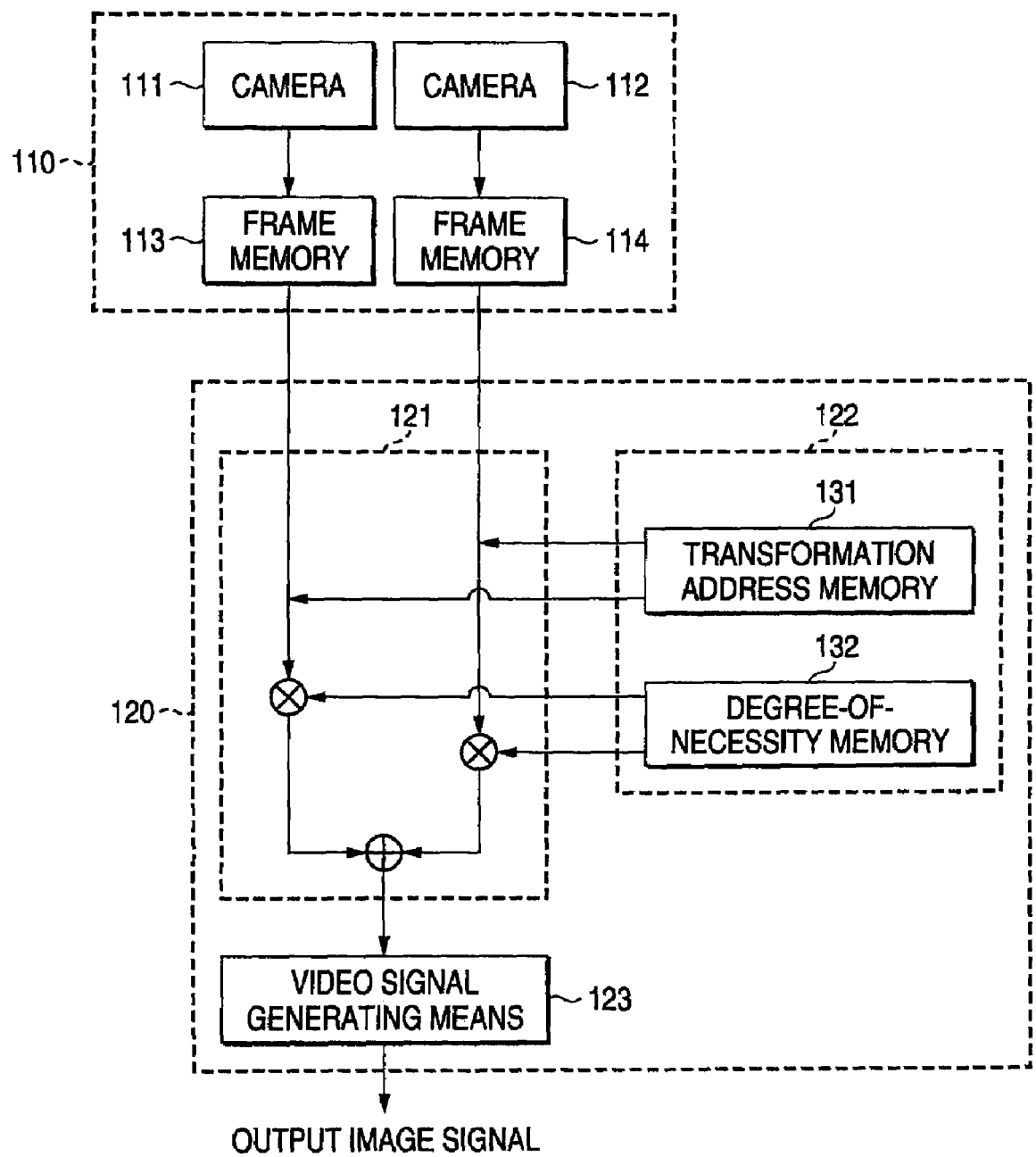
FIG. 10 is a block diagram of an image synthesizing system in the related art.
Figure 11:
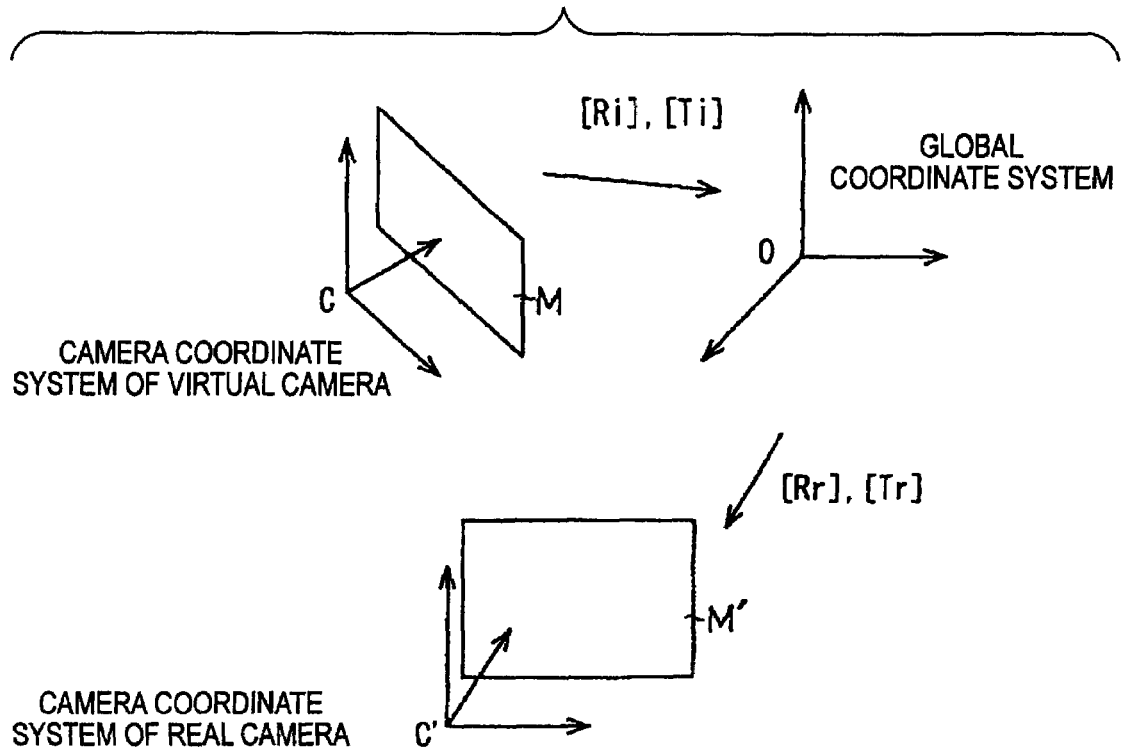
FIG. 11 is a view of relationships among a camera coordinate of a virtual camera, a camera coordinate of a real camera, and a global coordinate in the related art.
Figure 12:
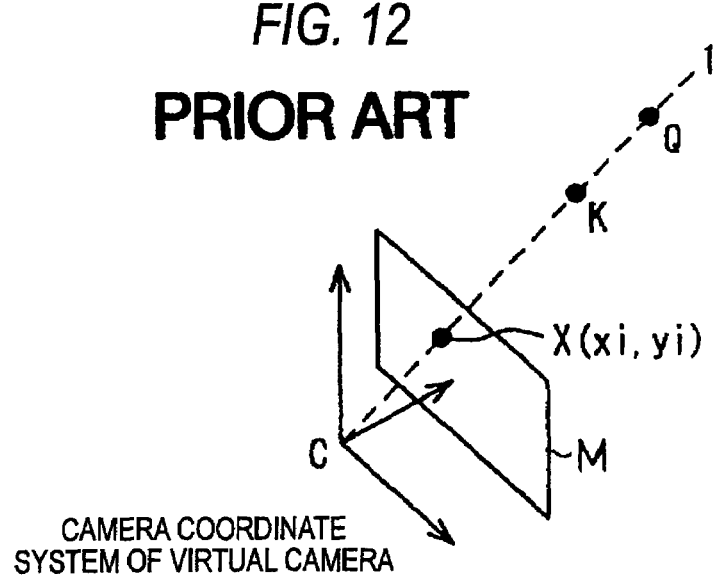
FIG. 12 is an explanatory view of a perspective projection in the related art.

The mapping table recording means 31 records the mapping table indicating the correspondences between the pixels on the virtual camera computed by the computing means 20 and the pixels on the real camera. FIG. 9 is an explanatory view of this mapping table. The mapping table recording means 31 has a first storing means for storing, in a data table, the relationship between the pixel coordinate position (u, v) of the virtual camera and the coordinate (x, y, z) on the projection model. The computing means 20 computes the relationship between the coordinate on the projection model and the pixel coordinate position (U, V) of the real camera based on the contents stored in the first storing means, then forms the relationship between the pixel coordinate position (u, v) of the virtual camera and the pixel coordinate position (U, V) of the real camera, and then stores such relationship in another data table in a second storing means as the mapping table. As the case may be, the identifying codes (indicated as "C1" in FIG. 9) of the real camera and a degree-of-necessity of each camera when a plurality of cameras correspond are recorded in the mapping table.

Next, an operation executed after the computing means 20 forms the mapping table by using the recorded data in the three-dimensional coordinate recording means 32 and then records the table in the mapping table recording means 31 will be explained hereunder.

In the imaging means 10, the images picked up by the camera 11 and the camera 12 are recorded in the frame memories 13, 14 respectively. The mapping table looking-up means 30 transforms the pixel position of the output image generated by the image synthesizing means 40 into the pixel position of the input image corresponding to the pixel, by looking up the mapping table recorded in the mapping table recording means 31. When one pixel position of the output image corresponds to a plurality of pixel positions of the input image, degrees-of-necessity of these pixels are also read from the mapping table.

The image synthesizing means 40 looks up the mapping table looking-up means 30 and reads the pixels of the input image corresponding to the pixels of the output image to be generated from the imaging means 10. If the pixel of the output image corresponds only to one pixel of the input image, the value of the input pixel is output to the image outputting means 50. Also, if no corresponding pixel is present, a previously decided value is output to the image outputting means 50.

If one pixel position of the output image corresponds to a plurality of pixel positions of the input image, these pixel values are synthesized according to degrees-of-necessity of respective pixels that are looked up simultaneously with the pixel positions of the input image. Simply, these pixel values are added according to the inverse ratios of degrees-of-necessity as the pixel values of the output image. The image outputting means 50 generates the output image from the pixels of the output image generated by the image synthesizing means 40 and outputs the output image.

In this manner, in the image synthesizing transforming system of the present embodiment, the data recorded previously in the three-dimensional coordinate recording means are utilized in the mapping table forming process. Therefore, it is unnecessary to execute a huge amount of computation required for the computation of the three-dimensional position at the time of forming the mapping table, and only the perspective projection transformation and the distortion correcting computation are required.

Accordingly, even though the computing means 20 does not have a high-performance computation power, the mapping table can be generated at a high speed after the imaging means are installed. As a result, the inexpensive image synthesizing transforming system having a wide versatility and needing easy maintenance can be implemented.

Second Embodiment

Figure 4:
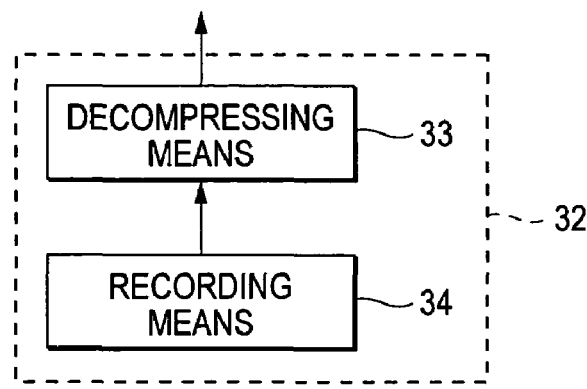
FIG. 4 is a block diagram of a three-dimensional coordinate recording means used in an image synthesizing transforming system according to a second embodiment of the present invention.

FIG. 4 is a block diagram of a three-dimensional coordinate recording means used in an image synthesizing transforming system according to a second embodiment of the present invention. Since an overall configuration and an operation of the image synthesizing transforming system in this embodiment are similar to those in the first embodiment, their illustration and explanation are omitted herein. Only a feature portion according to the second embodiment shown in FIG. 4 will be explained.

A three-dimensional coordinate recording means 32 shown in FIG. 4 is configured to have a recording means 34 for recording the three-dimensional position on the projection model corresponding to the previously-computed pixel position of the virtual camera in a data-compressed format, and an decompressing means 33 for decompressing the three-dimensional position recorded in a data-compressed format in the recording means 34 to restore into the original data.

An operation of the three-dimensional coordinate recording means 32 having such configuration will be explained hereunder. The recording means 34 records the three-dimensional position on the projection model corresponding to the previously-computed pixel position of the virtual camera in a data-compressed format based on a predictive coding. Normally, the projection model is defined as an aggregation of smooth surfaces such as planes, curved surfaces, etc. The three-dimensional position is represented as the intersection point between the projection model plane and a straight line indicating the viewing direction of the virtual camera.

Figure 5:
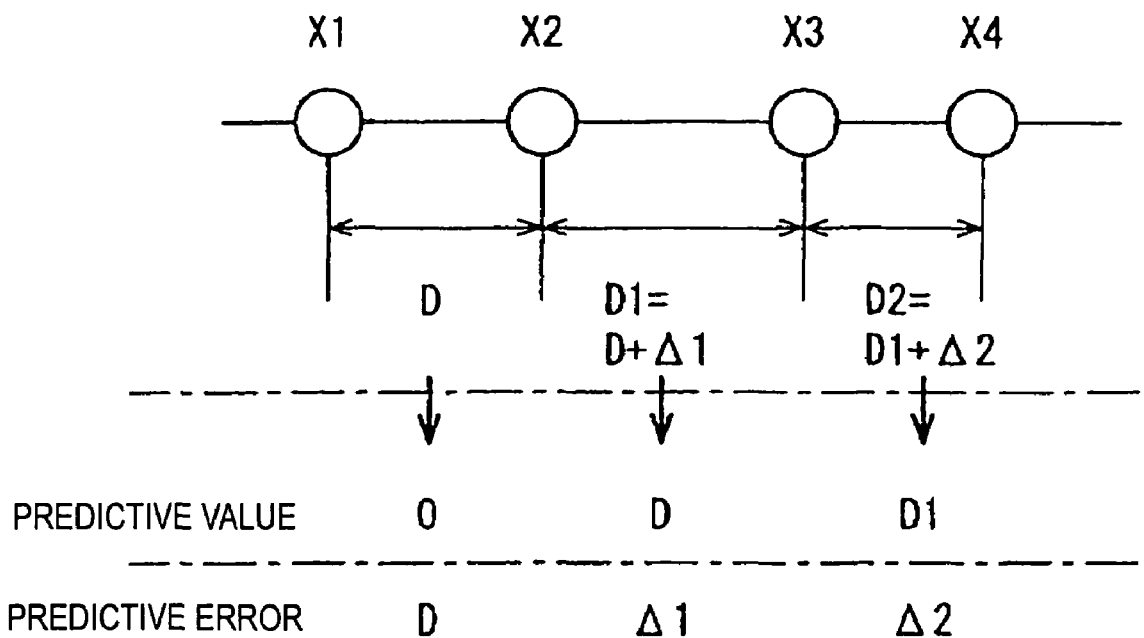
FIG. 5 is an explanatory view of a predictive coding used in the image synthesizing transforming system according to the second embodiment of the present invention.

Accordingly, the three-dimensional position is also changed relatively regularly on the projection model plane. Therefore, effective data compression can be achieved by the predictive coding. For example, as shown in FIG. 5, a high compression ratio can be attained by a simple compressing method that utilizes differences between respective components of the three-dimensional position and the preceding components as predictive values and utilizes differences (prediction errors) between respective predictive values and respective components of the three-dimensional position as compressed data, etc. FIG. 5 shows one dimension, but this method can be decompressed easily to three dimensions. Also, since the predictive coding can restore the original data by adding the predictive values and the prediction errors, a limited amount of computation is required to decompress the data and thus the decompressing process can be carried out at a high speed.

The decompressing means 33 restores into the original data by decompressing the three-dimensional position data recorded in a compressed format in the recording means 34. At this time, as described above, a high computation power is not required for the decompressing means 33 that decompresses the predictive coding.

In this manner, according to the above configuration, the present embodiment possesses the advantage of capable of recording the data used to form the mapping table by a small memory capacity not to need a high computation power. This is advantageous to the situation that, in order to make provision against the case where the mapping table must be reformed due to any cause during employment of the image synthesizing transforming system, the three-dimensional position data on the projection model corresponding to the pixel position of the virtual camera should be continued to maintain after the mapping table is formed.

Third Embodiment

Figure 6:
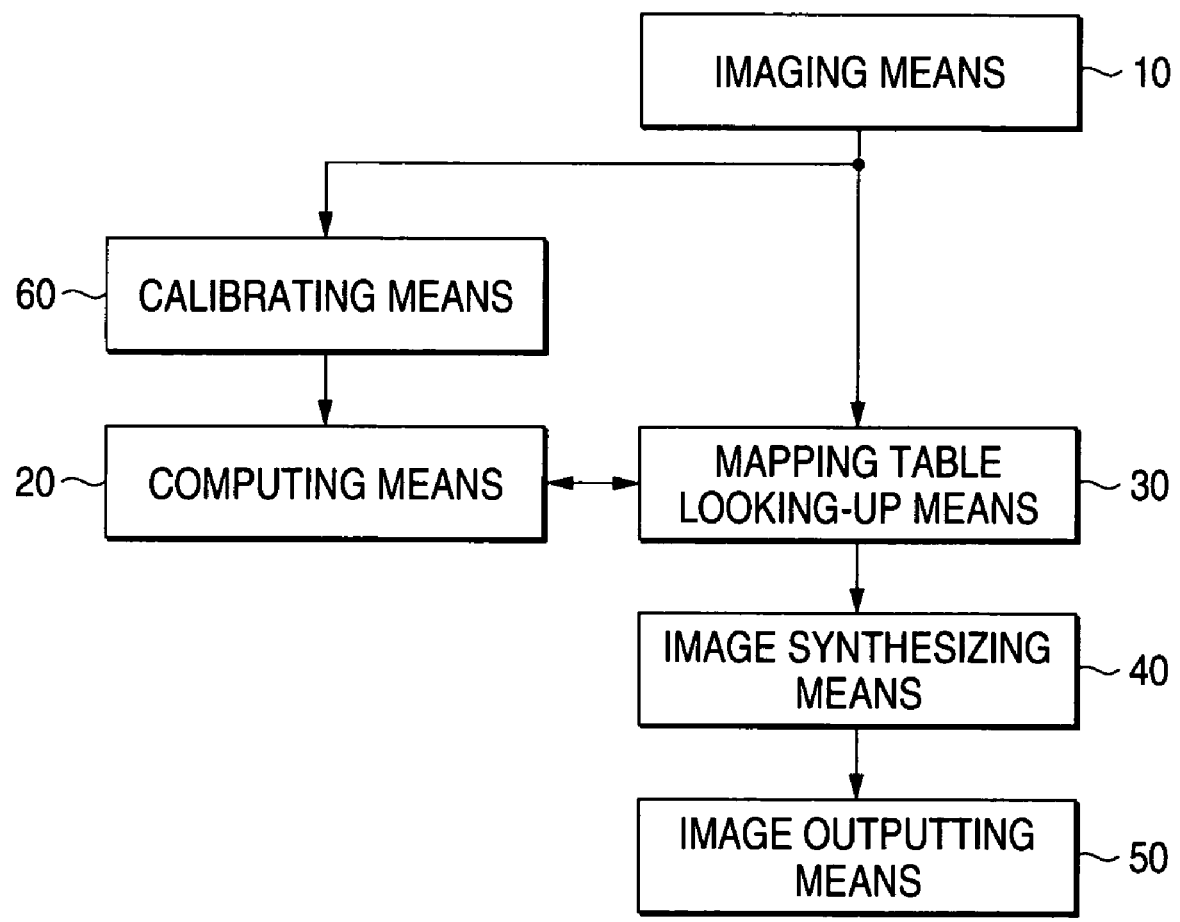
FIG. 6 is a block diagram of an image synthesizing transforming system according to a third embodiment of the present invention.

FIG. 6 is a block diagram of an image synthesizing transforming system according to a third embodiment of the present invention. The image synthesizing transforming system according to this embodiment is configured to have the imaging means 10, the computing means 20, the mapping table looking-up means 30, the image synthesizing means 40, the image outputting means 50, and a calibrating means 60. A configuration of the mapping table looking-up means 30 is similar to that in the image synthesizing transforming system according to the first embodiment or the second embodiment.

The calibrating means 60 generates calibration data of the imaging means 10 by correlating a point on the already-known global coordinate system in the screen picked up by the imaging means 10 with the pixel position on the screen, and then outputs the data to the computing means 20 as the camera parameter.

The computing means 20 computes the pixel position of the input image necessary for the generation of the output image, based on the camera parameter computed by the calibrating means 60 and the three-dimensional position on the projection model corresponding to the previously-computed pixel position of the virtual camera obtained by looking up the mapping table looking-up means 30. The computed result is recorded in the mapping table looking-up means 30 as the mapping table, The image synthesizing means 40 reads the input image corresponding to the pixel of the output image from the imaging means 10 by looking up the mapping table looking-up means 30, and generates the pixel of the output image. The image outputting means 50 generates the output image from the pixel generated by the image synthesizing means 40, and outputs such output image.

Since a basic operation of the image synthesizing transforming system having the above configuration is similar to that of the first embodiment, its explanation will be omitted herein. An operation of the calibrating means 60 that is different from the first embodiment will be explained only hereunder.

Figure 7:
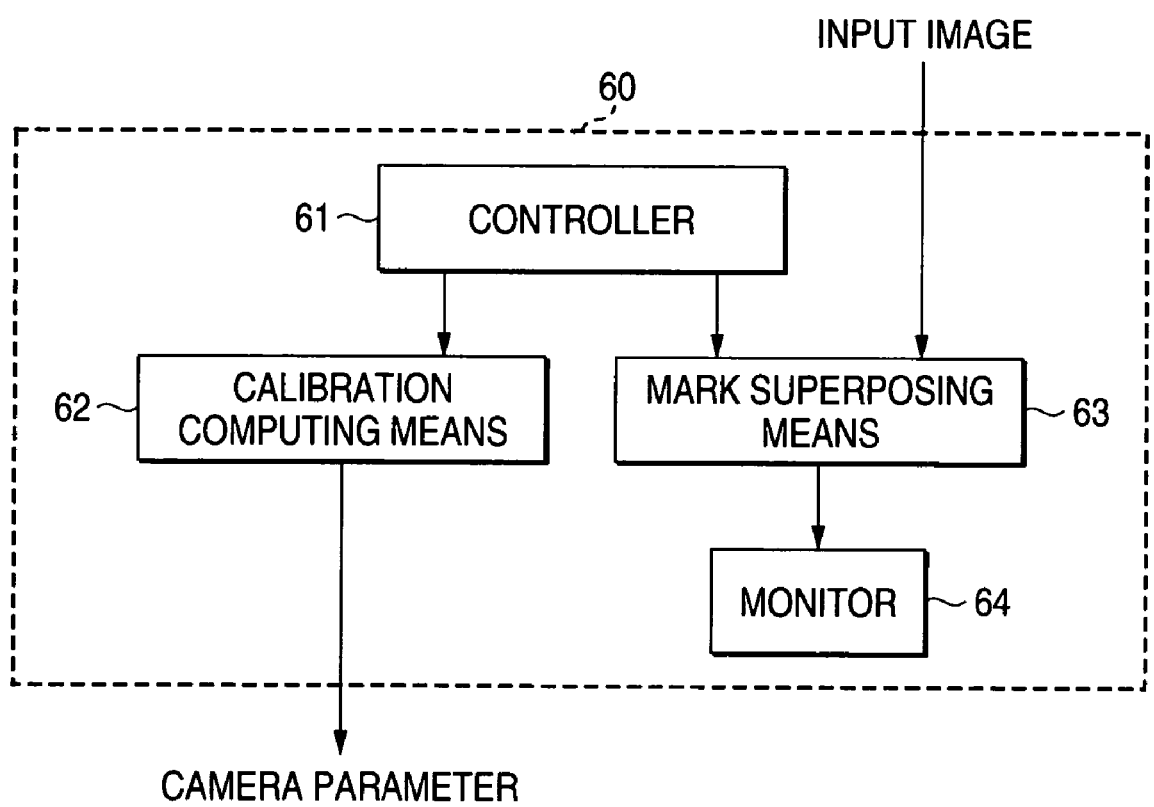
FIG. 7 is a block diagram of a calibrating means used in the image synthesizing transforming system according to the third embodiment of the present invention.

FIG. 7 is a configurative block diagram of the calibrating means 60. The calibrating means 60 is configured to have a mark superposing means 63 for superposing a mark for alignment on the input image, a monitor 64 for displaying the image on which the mark is superposed, a controller 61 for indicating a display position of the mark, and a calibration computing means 62 for computing the camera parameter based on the position of the mark and the coordinate of the point on the already-known global coordinate system, for example.

Figure 8:
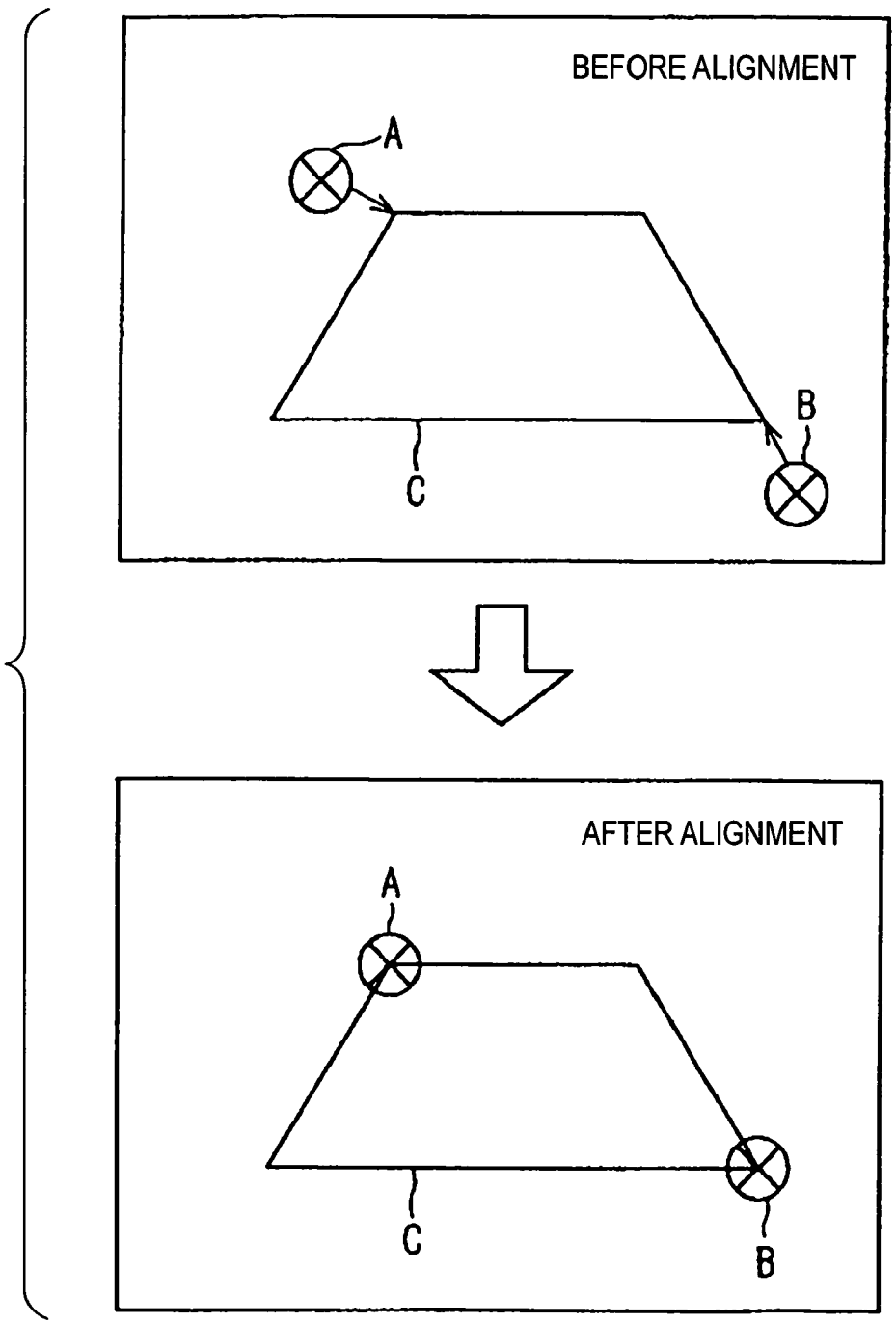
FIG. 8 is a view showing an example of a monitor display of the calibrating means used in the image synthesizing transforming system according to the third embodiment of the present invention.

FIG. 8 is a view showing a transition example of the display screen of the monitor 64 in FIG. 7. Alignment marks A, B are superposed on the input image by the mark superposing means 63 and then displayed on the monitor 64. Display positions of the alignment marks A, B are controlled by the controller 61, and the controller 61 informs the mark superposing means 63 of the display positions. In the example shown in the figure, since a plurality of alignment marks A, B are present, respective numbers of the marks A, B are also informed.

An alignment target C whose coordinate on the global coordinate system has already been known is illustrated in the input image. At this time, as shown in the monitor display (upper) before alignment in FIG. 8, when the marks A, B are displaced from the target C and displayed, the display positions of the alignment marks A, B are moved by the operation of the controller 61 to mate with predetermined point of the alignment target C. Thus, the monitor display state shown in the lower portion in FIG. 8 is brought about.

In the state shown in the lower portion in FIG. 8, the controller 61 informs the calibration computing means 62 of the end of the mark alignment and also informs the display positions of the marks A, B at that time. The calibration computing means 62 executes a calibration of the imaging means 10 that picked up the input image, based on the correspondence between the positions of the marks A, B informed by the controller 61 and the already-known coordinate on the global coordinate system, and then outputs the resultant camera parameter to the computing means 20.

In this example in FIG. 8, the number of points necessary for the alignment is set two. The number of points necessary for the alignment depends upon the number of variables that are required for the calibration of the imaging means 10.

As described above, according to the present embodiment, all the processes executed after the installation of the imaging means can be carried out by the image synthesizing transforming system solely. Therefore, the installation positions of the imaging means are in no way limited, and the installation of the imaging means is facilitated. Also, even when fitting positions of the imaging means are displaced by any cause, the mapping table can be reformed without an external high-performance computing unit, and thus easiness of the maintenance is improved.

The present invention is explained in detail with reference to particular embodiments. It is apparent for the person skilled in the art that various variations and modifications can be applied without departing from a spirit and a scope of the present invention.

This application is based on Japanese Patent Application No. 2002-57440 filed on Mar. 4, 2002, and the contents thereof is incorporated hereinto by the reference.

INDUSTRIAL APPLICABILITY

According to the present invention, the synthesis/transformation of the image can be implemented with an inexpensive configuration since a mapping table can be calculated not to built in a computing unit of high performance after imaging means are installed.

The invention claimed is:

1. An image transforming system for transforming an image input from an imaging unit, which picks up a real image, into a virtual image viewed from a predetermined virtual viewpoint to output, comprising:
   a first storing unit which stores in a data table correspondences between pixels on the virtual image and points on a projection model, and a second storing unit which stores in another data table correspondences between the pixels on the virtual image and pixels on the real image, wherein the pixels on the real image and the pixels on the virtual image are mutually correlated via a point on the projection model; and a computing unit which calculates a pixel position of the real image corresponding to a three dimensional position on the projection model stored in the first storing unit, by using an input camera parameter, to obtain different correspondences between the pixels on the virtual image and the pixels on the real image, and rewrites contents recorded in the second storing unit based on the obtained different correspondences.

2. The image transforming system according to claim 1, further comprising:

a predicting unit which predicts the camera parameter based on an installation position of the imaging unit, when the installation position of the imaging unit is previously decided.

3. The image transforming system according to claim 1, further comprising:

an obtaining unit which obtains a relative position of the imaging unit with respect to the point on the projection model as calibration data and predicts the camera parameter based on the calibration data.

4. The image transforming system according to claim 1, wherein the camera parameter is obtained by using calibration data acquired by an external calibrating unit.

5. The image transforming system according to any one of claims 2 to 4, wherein the first storing unit includes:

a recording unit which records aggregation data of points on the projection model in a compressed format by a predictive coding; and a decompressing unit which decompresses the aggregation data compressed and recorded by the recording unit to restore the aggregation data to an original format.

6. The image transforming system according to claim 1, wherein the first storing unit includes:

a recording unit which records aggregation data of points on the projection model in a compressed format by a predictive coding; and a decompressing unit which decompresses the aggregation data compressed and recorded by the recording unit to restore the aggregation data to an original format.

* * * * *